March 19, 1946. M. SCHWARTZ ET AL 2,396,889
PHOTOGRAPHIC APPARATUS
Original Filed July 18, 1938  7 Sheets-Sheet 1
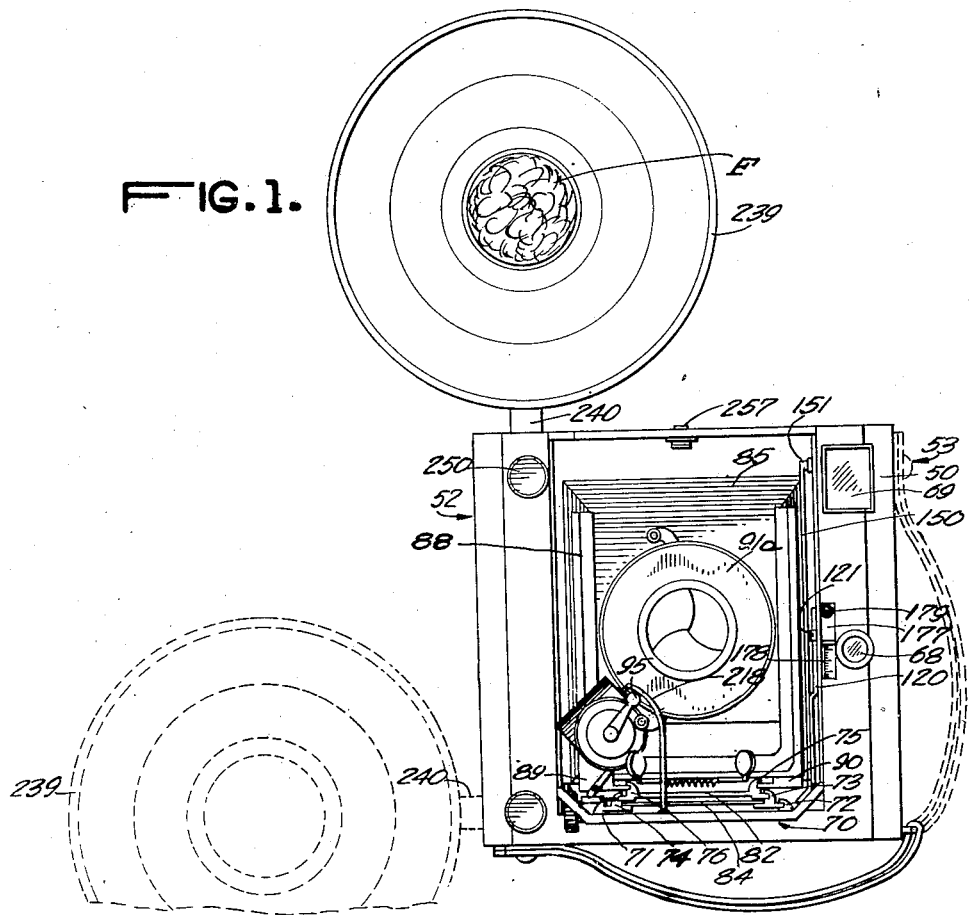
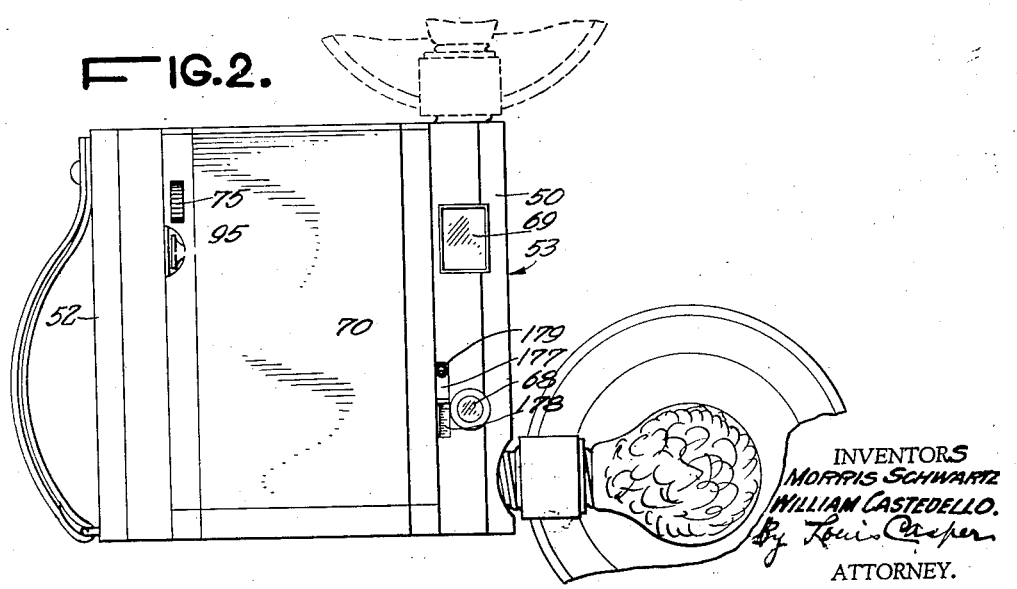
INVENTORS
MORRIS SCHWARTZ
WILLIAM CASTEDELLO.
By Louis Cooper
ATTORNEY.

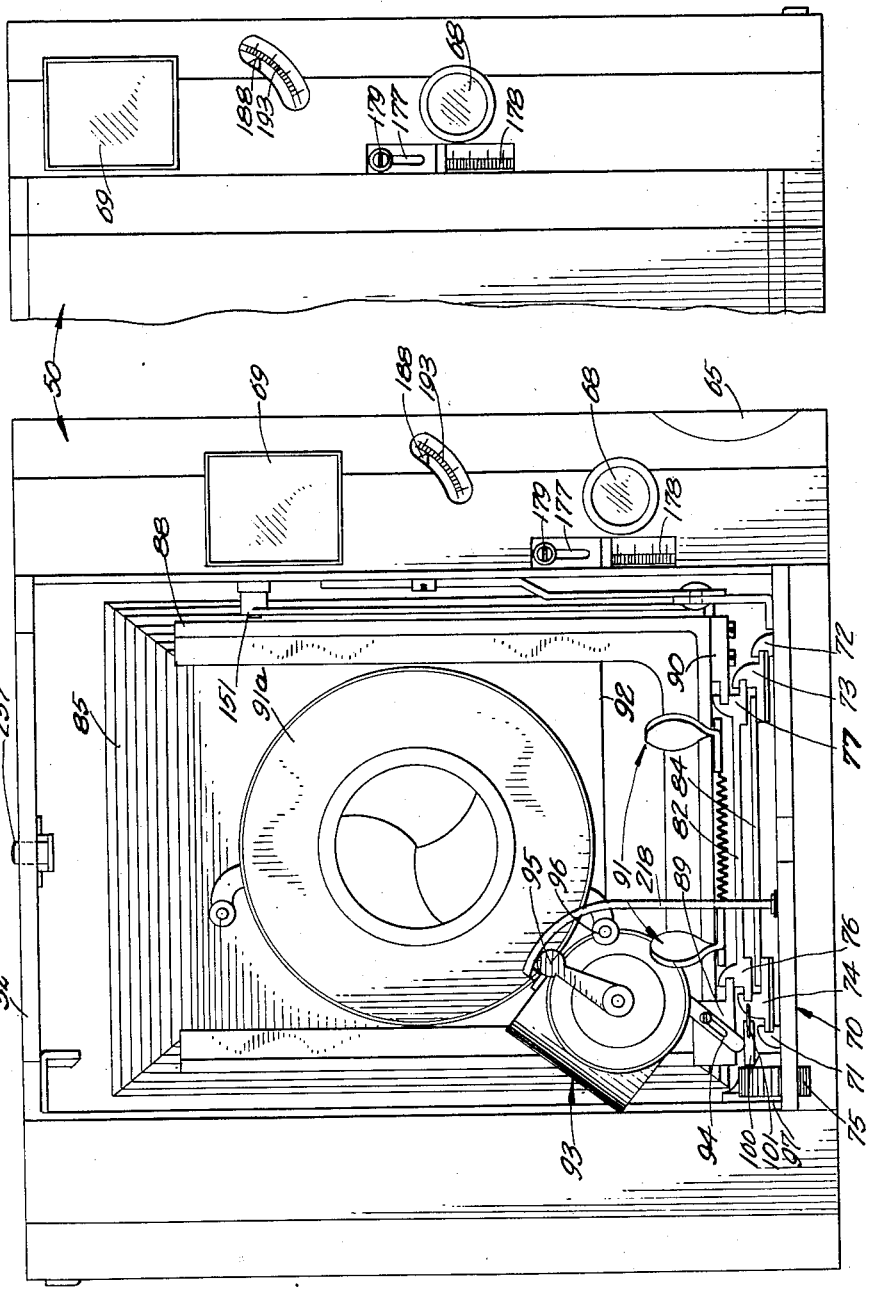

March 19, 1946.     M. SCHWARTZ ET AL     2,396,889
PHOTOGRAPHIC APPARATUS
Original Filed July 18, 1938    7 Sheets-Sheet 3
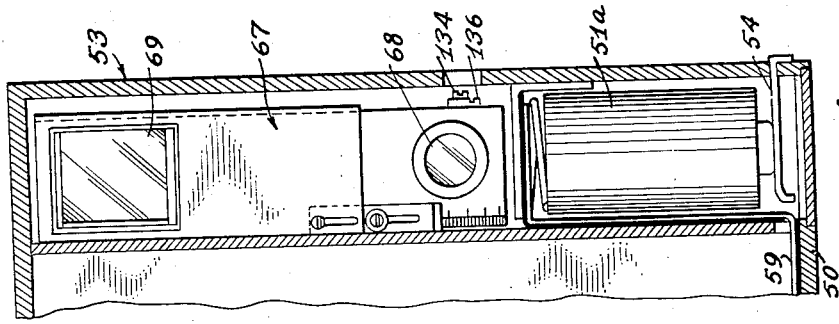
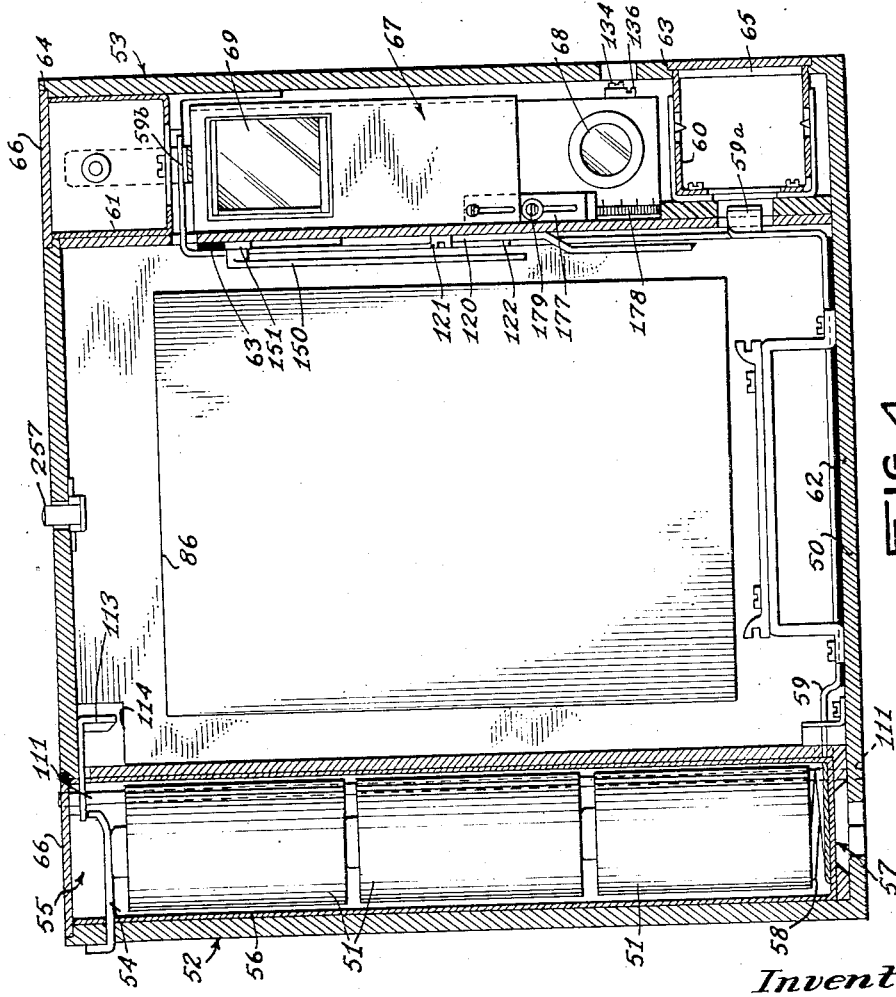
Inventors
MORRIS SCHWARTZ
WILLIAM CASTEDELLO
By
Attorney

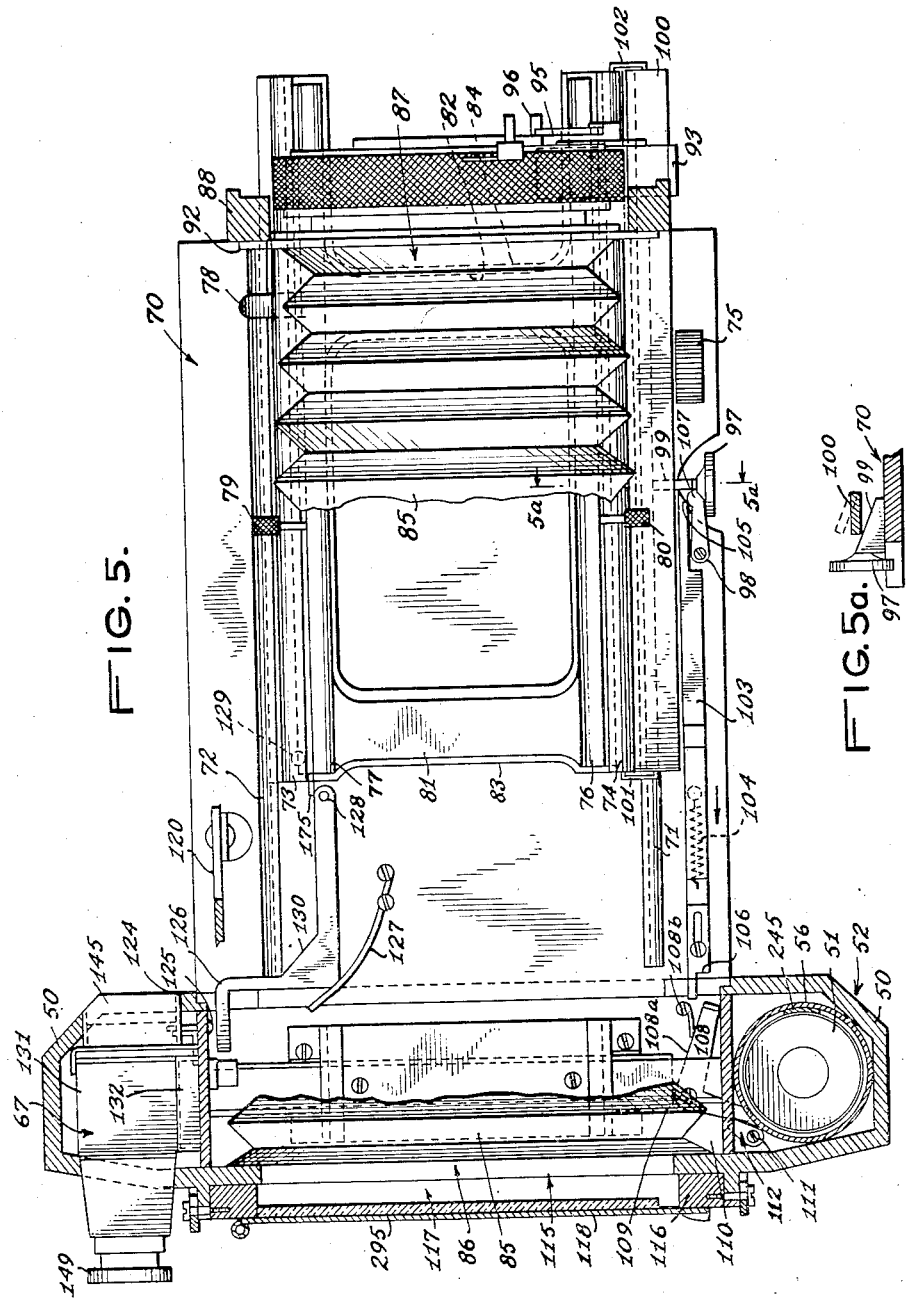

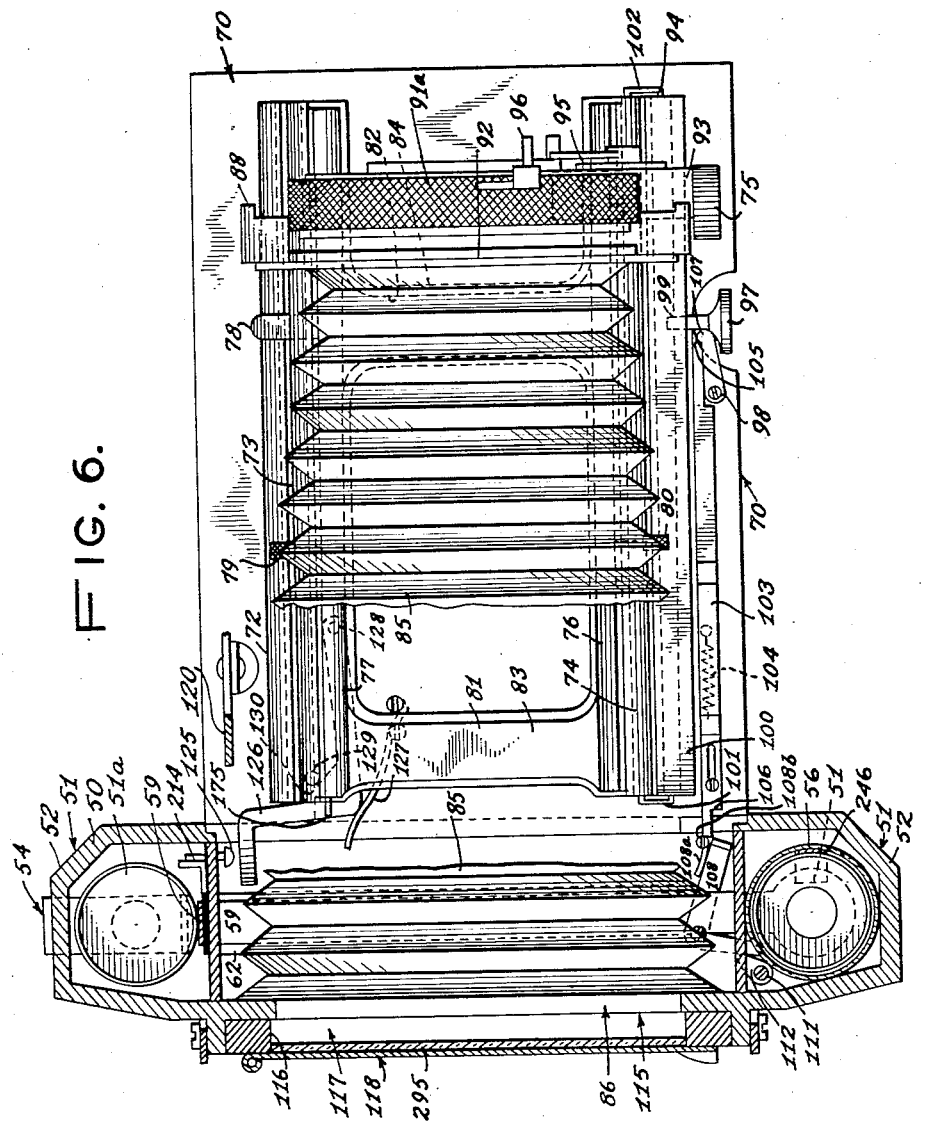

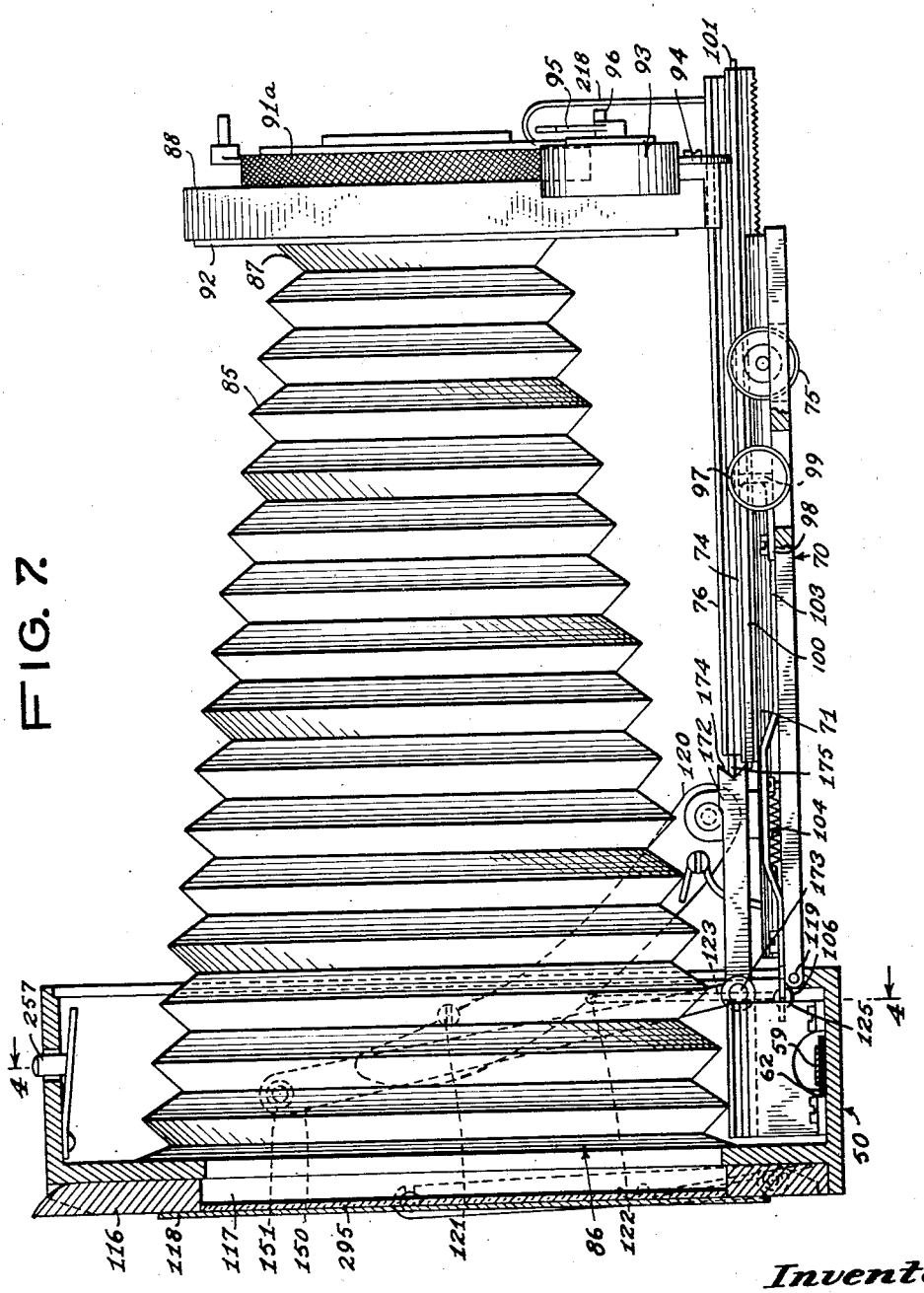

March 19, 1946.    M. SCHWARTZ ET AL    2,396,889
PHOTOGRAPHIC APPARATUS
Original Filed July 18, 1938    7 Sheets-Sheet 7

Inventors
MORRIS SCHWARTZ
WILLIAM CASTEDELLO
By
Attorney

Patented Mar. 19, 1946

2,396,889

UNITED STATES PATENT OFFICE 2,396,889

PHOTOGRAPHIC APPARATUS

Morris Schwartz, New York, N. Y., and William Castedello, Stamford, Conn., assignors to The Kalart Company, Inc., New York, N. Y., a corporation of New York Original application July 18, 1938, Serial No. 220,444. Divided and this application December 9, 1940, Serial No. 369,600

2 Claims. (Cl. 95—40)

Our invention relates to photographic picture taking apparatus, especially of the kind that has contained within said apparatus in one integral unit, the additional features of a range finder, photo flash synchronizer and a holder to contain a dry cell battery.

An object of this invention is to incorporate in said photographic apparatus flashlight synchronizer means integral to the body of said apparatus, and said synchronizer will reset itself automatically after each shutter opening and which will operate the camera shutter of said apparatus and ignite the flash bulb only when the photographic plate or film is ready for subsequent exposure.

A further object of the invention is to provide a photographic apparatus inside of which is incorporated a battery for operating said flashlight arrangement.

This present invention relates to and is a division of our application Ser. No. 220,444 filed July 18, 1938 which on December 17, 1940 issued as U. S. Patent No. 2,225,596.

As a further description of our invention attention is directed to the accompanying drawings forming a part of this specification and in which—

Fig. 1 illustrates a front view of a camera comprising the photographic apparatus showing the mechanism for operating the flashlight bulbs, also the manner in which the flashlights are fitted to individual reflectors and attached to the camera.

Fig. 2 illustrates a different manner of attaching the flashlights to the camera whereby the flashlights are plugged into the body of the camera proper. The figure further illustrates the camera shown in Fig. 1 when said camera is shut.

Fig. 3 shows an enlarged view of the front of the camera shown in Fig. 1. In this view the finder is located in a central position with respect to the camera. The figure further shows the arrangement employed when the flashlight bulbs are plugged into the camera body.

Fig. 3ª is a view of the camera body shown in Fig. 3 with the range finder placed on the upper part of said camera body.

Figure 7A:
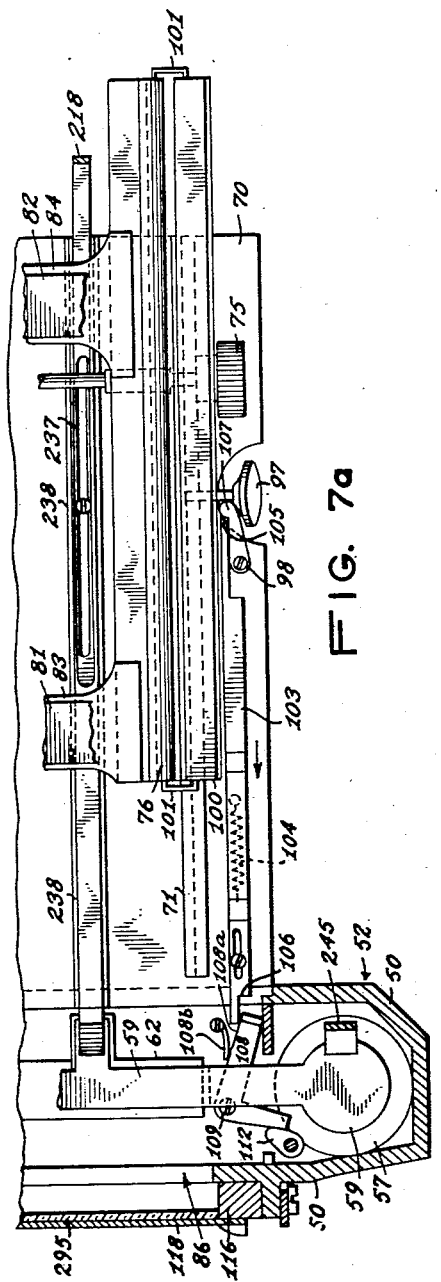

Fig. 4 is a section through the camera taken on the line 4—4 of Fig. 7 showing the battery arrangement and the position of the range finder in the camera when the flashlight is plugged into the camera body.

Fig. 4ª shows the range finder housed in the upper part of the camera and an extra cell of battery housed underneath, said fixed in range finder.

Fig. 5 is a partial cross-section plan view of the camera shown in open position when the bellows of the camera is expanded.

Fig. 5ª is a detail view taken on a line 5ª—5ª of Fig. 5.

Fig. 6 is a sectional view showing the camera in open position just preparatory to the closing of the same.

Fig. 7 is a side cross-section view showing the camera in open position with the bellows expanded.

Fig. 7ª is a partial cross-sectional view showing the camera carriage adjusting means and the top connection of the dry cell battery.

Figure 8:
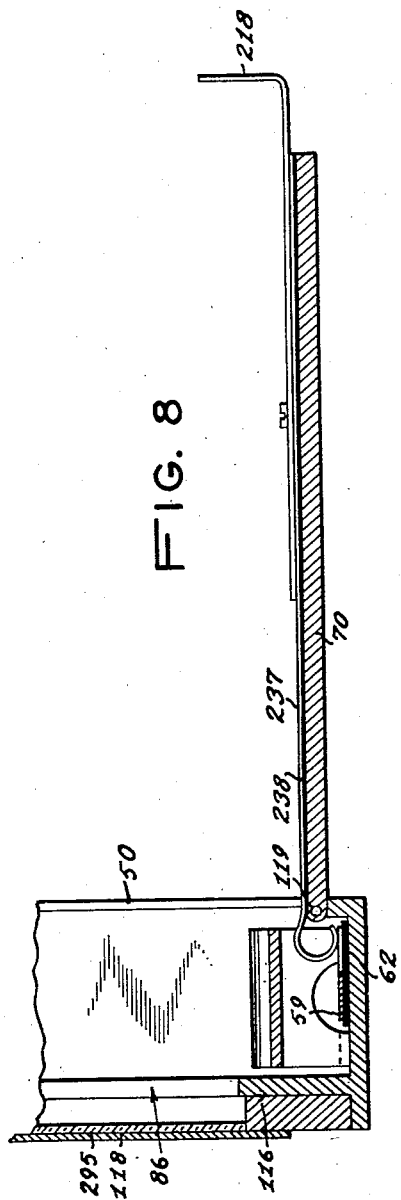

Fig. 8 shows a further connection of the flashlight synchronizer with the battery within the camera.

Referring to Fig. 4, the camera body 50 comprises a compartment for holding a set of battery cells on one side of the camera body 52 and a range finder on the opposite side of said body designated at 53. The battery cells 51 are connected in series and said battery is grounded to the camera body by means of a spring contact 54, the latter being so arranged that said spring contact can be slid out of normal position to allow refilling of the camera with battery cell renewals.

In addition to the aforesaid grounding connection for the battery, the spring contact 54 prevents the battery from dropping out of the camera. A cover 66 covers the battery cell refill aperture 56. The battery cells 51 are insulated from the camera proper by means of insulation tubing 56 and also by the insulation washer 57.

The bottom section of the battery cells 51 is connected through a spring 58 to the electrical connection 59. The connection 59 extends across to the opposite side of the camera 63 and terminates at 59ª and 59ᵇ in the sockets 60 and 61.

The electrical connection 59 is insulated from the body of the camera at 62. The apertures 63 and 64 of the sockets 60 and 61 are covered through the medium of covers 65, 66.

The range finder 67 is located in the space between the sockets 60 and 61.

The ranger finder 67 has two viewing objective lenses 68 and 69 which extend on the outside of the camera 50.

The arrangement shown in Fig. 4ª includes four cells of battery and the electrical connection 59 connects an additional cell of battery 51ᵃ to the battery 51.

Referring to Fig. 5. In this figure the camera 50 is shown in open position. The bed 70 of said camera carries parallel rails 71, 72. Another pair of rails 73, 74 slide into rails 71 and 72. Said sliding being attained by the turning of the knob 75.

A further addition of a pair of rails 76 and 77 is provided and are so arranged that said rails can slide on rails 73 and 74 by pressing upon a spring 78, said spring 78 leaving the rails 76 and 77 free to slide in the rails 73 and 74. (See Fig. 3.)

Pins 79 and 80 serve to limit the movement of the rails 76, 77. The rails 76, 77 are held together by cross-members 81 and 82. The rails 73 and 74 are held together by means of cross-members 83 and 84. The rails 71 and 72 are secured to the camera bed 70. (See Fig. 6.)

One end of the bellows 85 is secured at designation 86 to the body of the camera (Fig. 7) the opposite end at 87 being secured to the lens support 88. The lens support 88 has a pair of sliding shoes 89 and 90 (Fig. 3), which slide into the rails 76 and 77 when the winged thumb release 91 is operated by the camera operator. The pins 79 and 80 serve in this case to limit the movement of the lens support 88.

The lens and the shutter 91ᵃ are held to the lens support 88 by a plate 92. The flashlight release arrangement 93 is secured directly to the lens support 88. A slidably mounted bar 94 operates the flashlight release arrangement in timed relation to the camera shutter.

An impinging arm 95 operates the shutter 91ᵃ when said impinging arm 95 depresses the shutter arm 96.

Referring to Fig. 5, the flashlight synchronizer 93 which is operated by the sliding bar 94 is released by depressing a button 97 by the operator. (Fig. 6.)

The button 97 is hinged at 98 in such a manner that when it is depressed, a tapered portion 99 carries the elongated bar 100 to swing upward so that the slidably mounted bar 94 is pushed into the flashlight and shutter synchronizer 93 in order to operate the mechanism thereof.

The bar 100 is hinged at 101 and 102 to the rail 74.

When the button 97 is depressed by the camera operator a second bar 103 starts to slide on the rail carrier 70 and against the tension of a spring 104. Said bar 103 has a tapered end 105 and a stepped end 106. The rounded extension 107 rides over the tapered end 105 of the bar 103 thus forcing the bar 103 in the direction indicated by the arrow. (Fig. 5.) The bar 103 serves as a safety lock so that the flashlight synchronizer 93 and the shutter 91 cannot be operated unless the slide of the plate holder is removed from the camera, thus the flash bulb and shutter synchronizer will not function, thus saving an otherwise wasted flash bulb, the aforesaid action furthermore warns the operator of a misstep in manipulating until the negative plate holder is inserted in the camera and the slide is removed.

A forked arm 108 which swings at the pivot bearing 109 is secured to the bottom section of the camera casing 110. A shaft 111 which extends from the top to the bottom of the camera (see Figs. 4 and 5) operates a finger 112 which actuates the forked arm 108. The shaft 111 is actuated by an arm 113 at the top of the camera, said arm 113 extends through an opening 114 into the plate holder compartment 115.

Referring to Fig. 7. The plate holder is held to the camera by means of a horizontal hinged back 116, said back fitted with a ground glass. An opening 117 in said back 116 is covered through the medium of a shuttered door 118, which also protects the ground glass. The carrier bed 70 hinges to the camera box 50 at 119 and has a bed strut 120 with a stop pin 121. Since it is required that the camera be permitted to collapse before the lens carrier is slid into its housed position, a locking pin 122 is arranged to extend from the body of the camera and to place itself in the path of the bed strut 120. The pin 122 is operated by a hinging arm 123 which swings at 124, and its lower end 125 is in connection with a hinging forked arm 126. (See Fig. 5.)

The hinging arm 126 is under tension of the spring 127 and hinges at 128. (See Fig. 6.)

Preparatory to housing the lens support, the pin 129 (Fig. 5) which is secured at the bottom of the rail 73, rides over a tapered side section 130 of the forked hinging arm 126, thus depressing said arm against the spring 127 and allowing the pin 122 (Fig. 7) to be housed into the body of the camera and thus allowing the strut 120 to be released and which will enable the proper housing of the bellows and lens support 88.

The range finder 67 includes a rectangular casing 131. Another rectangular casing 132 is held to said casing 131. (See Fig. 5.)

Referring to the flashlight synchronizer 93 shown in Fig. 3, a hinging arm 95 operates the shutter 91ᵃ by depressing the shutter release 96. The mechanism of the flashlight synchronizer is operated by a slidably mounted bar 94, said bar 94 resting on the hinging bar 100. When the knob 97 is depressed, said knob causes the bar 100 to swing upward through the tapered portion 99. (See Fig. 6.)

In the arrangement of the flashlight synchronizer shown in Fig. 1, the wire connections to the battery cells comprise a rail 237 (see Fig. 8) which is insulated from the camera proper through the medium of the flat insulated bar 238. The rail 237 connects the synchronizer to the battery cells 51 by contacting with the battery connection 59. (See Fig. 7ᵃ.)

*Operation*

The camera operator first opens the camera by pressing on the release spring 257 which allows the camera bed 70 to swing outwardly as far as the bed strut 120 will permit. The bed strut 120 locks into the position on the pin 121 when the rail carrier 70 is opened a full 90°. The operator then inserts the plate or film holder into the camera by placing said holder in the space between the opening of the camera 115 and the ground glass back 116. The plate holder slide is then removed. The shutter operating button 97 cannot be operated unless the slide aforesaid is removed for the following reasons:

The hinging arm which protrudes through the opening 114 and against the plate holder is connected through the medium of the shaft 111 to the hinging finger 112. (See Figs. 4 and 6.) Said finger holds the forked arm 108 in position as shown in Fig. 7ᵃ, so that when the button 97 is depressed and the sliding bar 103 is pushed in the direction of the arrow (see Figs. 5 and 7ᵃ), the stepped end 106 of the flat bar 103 contacts with the extension 108ᵃ of the forked arm 108 and limits the movement of the bar 103. In this manner the bar 103 serves as a safety locking arrangement in connection with the operation of the camera.

As soon as the plate holder slide is removed, the pressure of the finger 112 against the forked arm 108 is released, the forked arm 108 returns to the position shown in Fig. 5 or Fig. 7ª due to the pressure of the spring 108ᵇ, and the sliding bar 103 is thus allowed to advance in the direction shown by the arrow when the knob 97 is depressed by the camera operator.

After the plate holder slide is removed, the operator views the object through the viewing tube 149 and at the same time turns the knob 75 to obtain the correct focus, said adjustment depending upon the distance of the object. The knob 75 is turned until two images of the object being viewed are merged in the range finder.

The next step for taking the picture is to depress the button 97 which operation will swing the bar 100 upward as shown in Fig. 5ª. The swinging of said bar 100 operates the sliding bar 94 which in turn operates the mechanism of the flashlight synchronizer 93 as disclosed in the above mentioned Patent No. 2,225,596.

The synchronizer being grounded to the camera, the current is supplied to the flashlight bulb F for flashing an object at the time of picture taking.

At a predetermined time, the hinging finger 95 contacts with the shutter release 96 and operates the shutter 91 thus completing the cycle of taking a picture.

When the operator removes his finger from the button 97, the slidable bar 94 returns to its original resting position shown in Fig. 3 due to the pressure of a spring (not shown) in the flashlight synchronizer.

It is understood that the particular photographic apparatus described above is intended to be merely illustrative and not limitative of the invention, since it is obvious that the invention may be effected by apparatus arranged in other different ways, within the scope of the claims.

Now having described our invention, what we claim is:

1. In a photographic apparatus including a casing having hingedly attached thereto a bed member, a bellows secured at one end thereof to said casing and contiguous to a compartment for receiving a plateholder, the opposite end of said bellows being secured to an objective lens carrier having a shutter associated therewith movable along said bed member, a synchronizer unit mounted on said lens carrier for igniting a flash bulb in timed relation to the tripping of said shutter, a release button in fixed position on said bed member, a first member operable by said release button for releasing said synchronizer unit for any position of said lens carrier, a second member operated by said release button, a blocking element for said second member and means operated by the slide of said plateholder when in said receiving compartment for operating said blocking element to prevent movement of said second member by said release button whereby release of said synchronizer unit is prevented until the removal of said slide from said plateholder.

2. The combination as set forth in claim 1 and including in said casing a compartment for holding battery cells on one side of said bellows receiving compartment and recesses on the other side of said bellows receiving compartment for holding photo flash bulbs and fixed electrical conducting strips for electrically connecting batteries in said battery compartment with photo flash bulbs in said recesses through said synchronizer unit.

MORRIS SCHWARTZ.
WILLIAM CASTEDELLO.